United States Patent [19]

Lasky et al.

[11] 4,142,778
[45] Mar. 6, 1979

[54] STEREOSCOPIC VIEWER AND REPLACEABLE CARTRIDGE THEREFOR

[76] Inventors: Max Lasky, 3705 Lonsdale Ave., Cincinnati, Ohio 45227; Fred Perlin, 767 Plaza Amigo, Palm Springs, Calif. 92262

[21] Appl. No.: 772,940

[22] Filed: Feb. 28, 1977

[51] Int. Cl.² ............................................. G02B 27/02
[52] U.S. Cl. .................................................. 350/135
[58] Field of Search ...................... 40/86 A; 354/114; 350/133, 134, 135, 139

[56] References Cited

U.S. PATENT DOCUMENTS

| | | | |
|---|---|---|---|
| 2,573,543 | 10/1951 | Childs | 350/135 |
| 2,709,401 | 5/1955 | Jaros | 350/135 X |
| 2,814,966 | 12/1957 | Crossley | 350/135 |
| 3,722,983 | 3/1973 | Brassington | 350/135 |

*Primary Examiner*—John K. Corbin
*Assistant Examiner*—Scott J. Sugarman
*Attorney, Agent, or Firm*—Dressler, Goldsmith, Clement, Gordon & Shore, Ltd.

[57] ABSTRACT

A stereoscopic viewer and film cartridge combination is provided in which a viewer body having opposite sides, a front provided with a pair of viewing lenses spaced eye distance apart, and an open rear is removably combined with a cartridge for holding a film strip having stereoscopic pairs of pictures arranged along the length thereof. The cartridge is smaller than the open rear of the viewer so as to be receivable therein and withdrawable therefrom, and the viewer includes support means movable in the viewing direction and removably engageable with the cartridge so that the cartridge can be supported by the support means and moved to bring the film strip contained within the cartridge into the focal plane of the pair of lenses. The film strip preferably contains pairs of pictures separated by a distance which is greater than eye distance, and the cartridge includes means for forcing the film to traverse an undulating path between spaced apart viewing positions separated by eye distance.

6 Claims, 6 Drawing Figures

STEREOSCOPIC VIEWER AND REPLACEABLE CARTRIDGE THEREFOR

The present invention relates to stereoscopic viewers which do not require the use of separate slides. Instead, and in this invention, the stereoscopic pairs of pictures to be viewed are spaced apart along the length of an elongated film strip, which is the form in which such pictures are usually taken. The film strip is placed in a cartridge and advanced to move the film axially and thereby exhibit successive pairs of pictures, one showing the left eye image and the other the right eye image, as is customary in viewing stereoscopic picture pairs. If separate slides were used, this would not only require additional expense, but these slides could be mislaid or their sequence could be altered.

It is particularly intended to employ standard 35mm film in which each picture extends over five sprocket holes and the distance between the left and right eye images is ten sprocket holes, providing a center-to-center distance between associated images of 2.805 inch. This distance is greater than the normal 2.50 inch distance between the eyes of a person, and this introduces a further difficulty.

With 16 mm. film, the center-to-center distance between associated images is 2.700 inch, which is again greater than the normal 2.50 inch distance, so the same problem exists. It could similarly exist with other film sizes.

The invention includes various features, among which are:

1 — A simple mechanical means to shorten the distance between associated images to 2.50 inch, which is the average inter-ocular distance, without altering the film;
2 — A novel cartridge for storing, loading and cataloguing the film which avoids the need to thread the film into the viewer; and
3 — A simplified structure for simultaneously associating the cartridge with the viewer and focusing the images.

More particularly, in accordance with this invention, a stereoscopic viewer and film cartridge combination is provided in which the viewer body has opposite sides, a front provided with a pair of viewing lenses spaced eye distance apart, and an open rear, and a cartridge holds a film strip having stereoscopic pairs of pictures arranged along the length thereof. The cartridge is smaller than the open rear of the viewer so as to be receivable therein and withdrawable therefrom, and the viewer has support means movable in the viewing direction and removably engageable with the cartridge so that the cartridge can be supported by the support means and moved to bring the film strip contained within the same into the focal plane of the pair of lenses.

The film strip preferably contains the stereoscopic pairs of pictures separated by a distance which is greater than eye distance, and the cartridge includes a centrally positioned means for forcing the film to traverse an undulating path between spaced apart viewing positions separated by eye distance so that the pairs of pictures can be viewed by eye distance apart lenses, despite the fact that the pictures are not eye distance apart along the length of the film.

In the preferred construction, the support means comprises a pinion shaft extending between the sides of the cartridge above the line of sight of the viewing lenses and the pinion shaft engages rack slides carried by the sides of said cartridge. These slides are formed with enlarged heads which are removably engageable with guideways which are carried by the cartridge, the guideways being open at their lower end so that the cartridge can be hung on the slides. When the cartridge has a translucent body, the viewing of the pictures by available light is particularly simple and highly effective.

Other and further features of the invention, as well as the operation of the viewer and cartridge, will become apparent from the description which follows taken in conjunction with the accompanying drawings in which.

Figure 1:
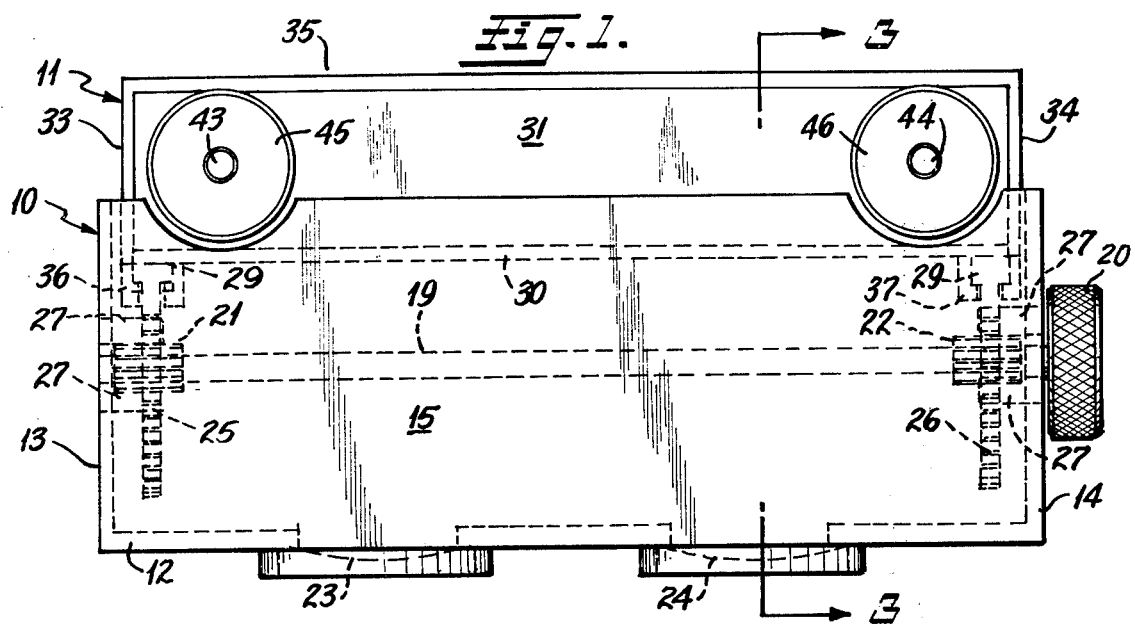
FIG. 1 is a top plan view showing an illustrative stereoscopic viewer-film cartridge combination in accordance with the invention.
Figure 2:
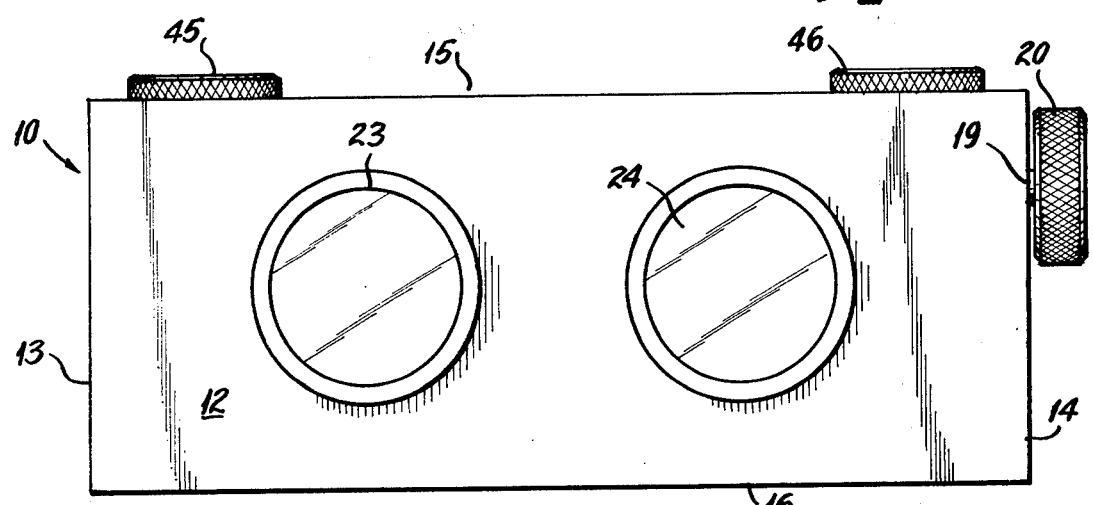
FIG. 2 is a front elevation of the combination shown in FIG. 1.

Referring first to FIGS. 1 and 2, the numeral 10 generally identifies a viewer and 11 identifies a cartridge associated therewith. The viewer 10 includes a molded plastic body 12 which is closed at the opposite sides 13 and 14, at the top and bottom 15 and 16, and at the front 17, but which is open at the rear 18 to receive the cartridge 11. The front 17 of the viewer body is provided with a pair of viewing lenses spaced 2.500 inch apart, center-to-center which is normal eye distance.

A pinion shaft 19 extends through the side wall 14 and is rotatably mounted on the side wall 13 for rotation by means of knob 20 which is disposed on the outside of the viewer adjacent side 14. The shaft 19 is positioned above the line of sight as shown by the position of knob 20 in FIG. 2 and the shaft carries pinions 21 and 22. The viewing lenses 23 and 24 are thus below the line of the shaft 19 and are more closely spaced than the associated pictures to be viewed.

Figure 3:
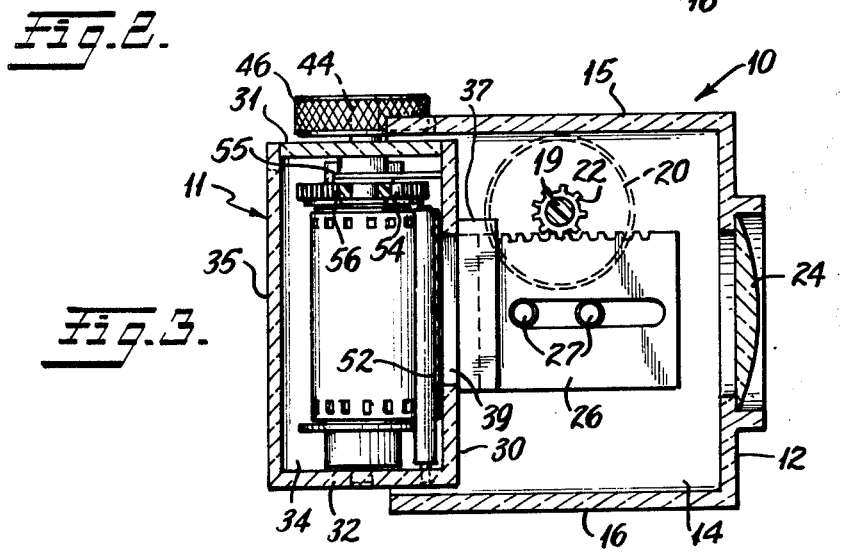
FIG. 3 is a cross-section taken on the line 3—3 of FIG. 1.

The pinions 21 and 22 engage with rack slides 25 and 26 which are slotted as shown in FIG. 3 to slide on pins 27 which extend inwardly from the side walls 13 and 14. The slots are identified at 28 and the slides 25 and 26 are formed with enlarged heads 29 to enable removable securement to the cartridge 11. As can be seen in FIG. 2, rotation of knob 20 will rotate pinion 22 to cause the rack slide 26 to move along its length and thereby shift the head 29 from a rearmost position to a forwardmost position. In the rearmost position (which is furthest from the lenses 23 and 24) the cartridge 11 is outside the viewer 10 which allows it to be removed or replaced as desired.

Figure 4:
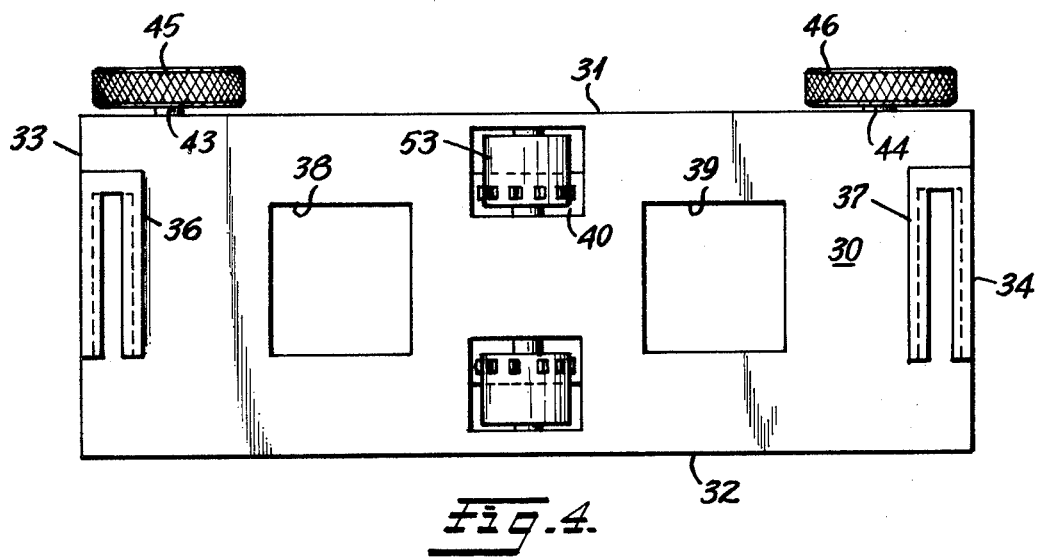
FIG. 4 is a front elevation of the cartridge.

The exterior of the cartridge 11 is shown in FIG. 4 where it can be seen that the cartridge is constituted by a front wall 30, top and bottom walls 31 and 32, and side walls 33 and 34. A rear wall 35 is preferably present and is translucent in preferred practice. The front wall 30 is removable for film insertion, and this is achieved by having it snap into the cartridge body constituted by a molding of translucent plastic which forms the walls 31, 32, 33, 34 and 35 as one integral piece.

Front wall 30 carries guideways 36 and 37 which are open at one end (the bottom end) to receive the heads 29 of the slides 26 when these slides are projected rearwardly to their fully projected position in which the heads 29 extend beyond the rear 18 of the viewer body 10. This allows one to lower the cartridge 11 onto the extended heads 29 and the cartridge descends until it is aligned with the open rear 18 of the viewer body 10. At this point the focusing knob 20 is rotated to draw the cartridge 11 into the rear 18 of the body 10 as shown in FIG. 1 and the film within the cartridge is brought into focus at the same time. Cartridge 11 is dimensioned to fit within the open rear of the viewer 10.

Front wall 30 includes picture viewing apertures 38 and 39 so that one can look through to see the film within the cartridge. These apertures, like the lenses, are 2.500 inch apart, but the associated pictures on the film strip are further apart and this is handled as shown in FIGS. 5 and 6 where the mounting of the film strip and the interior of the cartridge are shown.

Figure 5:
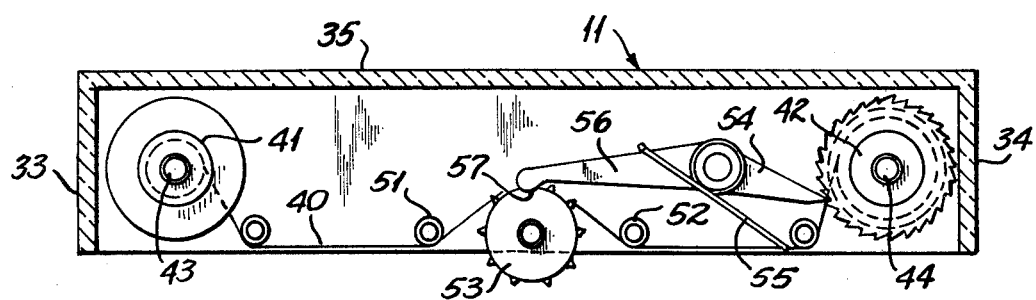
FIG. 5 is a plan view, in section, showing the mounting of the film within the cartridge.
Figure 6:
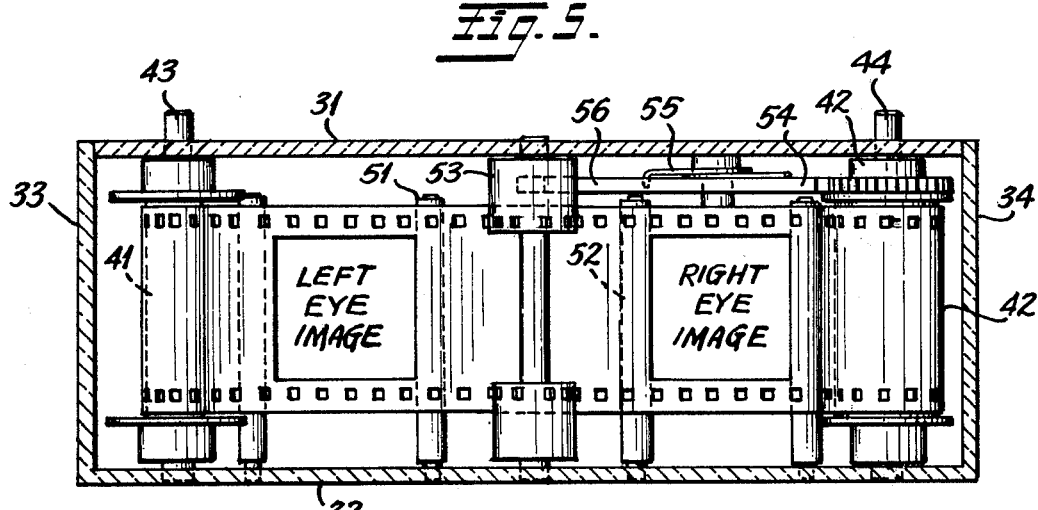
FIG. 6 is a front elevation of the cartridge with the front wall removed.

The cartridge 11 is shown in FIGS. 5 and 5 with the front wall 30 removed. The film strip 40 is held on reels 41 and 42 which are mounted at the opposite ends of the cartridge, the reels having axles 43 and 44 which extend through the top wall 31 where they engage with winding knobs 45 and 46 (see FIG. 4) to allow the film strip 40 to be moved axially so that the stereoscopic images can be moved to viewing position as illustrated in FIG. 6.

The path of movement of the film is shown in FIG. 5 where it will be seen that a centrally positioned set of rollers including guide rolls 51 and 52 and positioning roller 53 force the film 40 to traverse an undulating path as it moves between the left and right eye image position. As a result, and while the pictures on the film strip are spaced apart by a distance greater than the eye distance, they are forced to assume a position within the cartridge which is exactly eye distance apart as is required for appropriate viewing.

To assist image positioning, a stop mechanism 54 can be employed in which a spring 55 is employed to bias a stop lever 56 into a recess 57 in the positioning roller 53 so that the film will automatically stop after the film has been moved the distance between adjacent frames. This mechanism for periodically stopping the film is optional and can be omitted if desired.

It will be understood that the stereoscopic camera reverses the images so that when the film strip is prepared for viewing, the left and right eye images must be reversed. However, the sprocket holes in the film are fixed, so that problem of correcting the spacing of the images persists.

The invention is defined in the claims which follow.

We claim:

1. A stereoscopic viewer and film cartridge combination comprising a viewer body having opposite sides, a front provided with a pair of viewing lenses spaced eye distance apart, and an open rear, a cartridge for holding a film strip having stereoscopic pairs of pictures arranged along the length thereof, said cartridge being smaller than the open rear of said viewer so as to be receivable therein and withdrawable therefrom, said viewer having support means movable in the viewing direction and removably engageable with said cartridge whereby said cartridge can be supported by said support means and moved to bring the film strip contained within the same into the focal plane of said pair of lenses, said support means comprising a pinion shaft extending between the sides of said cartridge above the line of sight of said lenses, said pinion shaft engaging rack slides carried by the sides of said cartridge.

2. A combination as recited in claim 1 in which said cartridge includes means for holding reels at the opposite ends thereof and winding means for each of said reels.

3. A combination as recited in claim 2 in which said film strip contains said stereoscopic pairs of pictures separated by a distance which is greater than eye distance, and said cartridge includes a centrally positioned means for forcing said film to traverse an undulating path between spaced apart viewing positions separated by eye distance so that said pairs of pictures can be viewed by lenses eye distance apart despite the fact that the pictures are not eye distance apart.

4. A combination as recited in claim 1 in which said cartridge is constituted by a translucent body.

5. A combination as recited in claim 4 in which said cartridge is open at the portion thereof facing said viewer.

6. A combination as recited in claim 1 in which said slides are formed with enlarged heads which are removably engagable with guideways open at their lower end which are carried by said cartridge.

* * * * *